C. B. THWING.
PYROMETER.
APPLICATION FILED JULY 9, 1907.
919,399.
Patented Apr. 27, 1909.
2 SHEETS—SHEET 2.
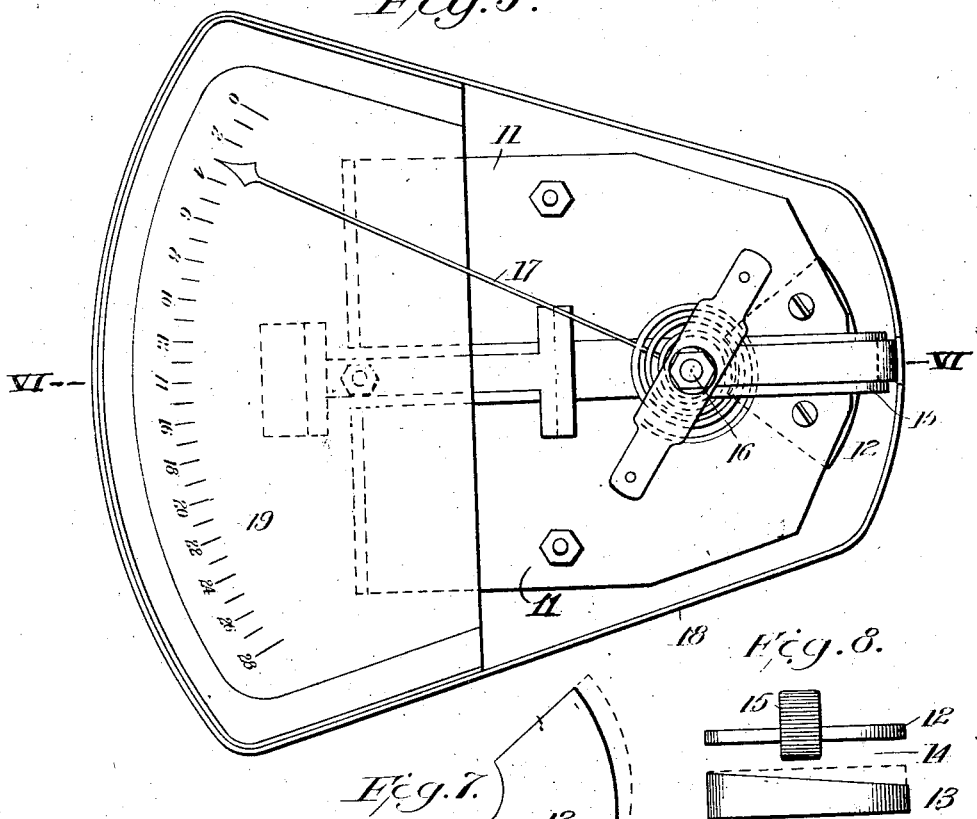
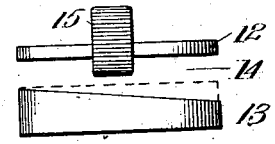
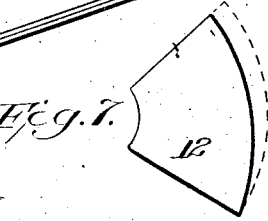
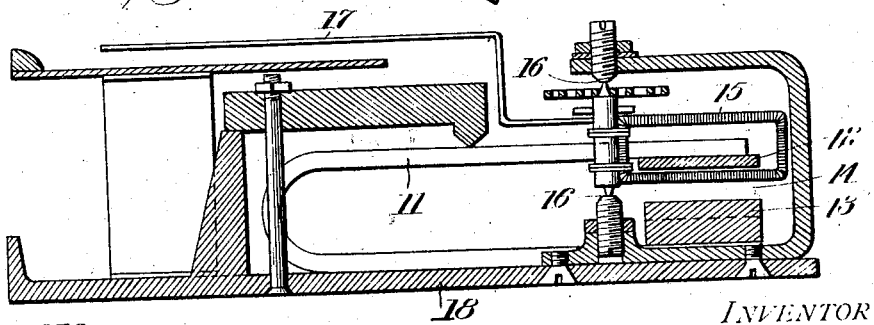
WITNESSES:
INVENTOR
Charles B. Thwing
BY
Attorney

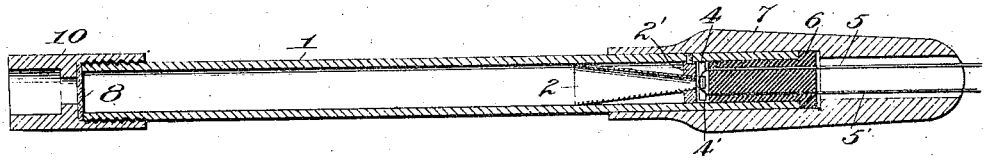
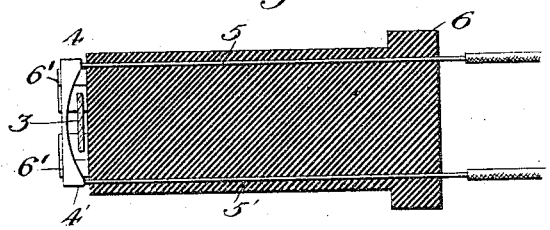
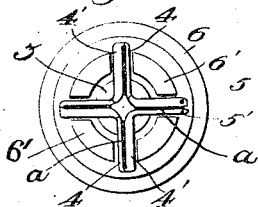
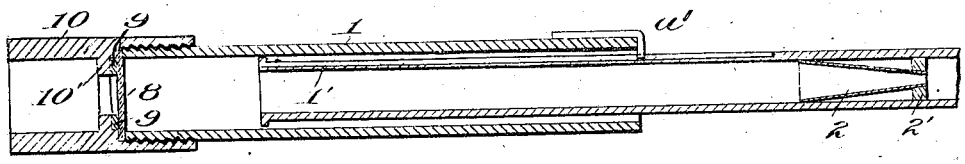

UNITED STATES PATENT OFFICE.

CHARLES B. THWING, OF PHILADELPHIA, PENNSYLVANIA.

PYROMETER.

No. 919,399.

Specification of Letters Patent.

Patented April 27, 1909.

Application filed July 9, 1907. Serial No. 382,878.

*To all whom it may concern:*

Be it known that I, CHARLES B. THWING, a citizen of the United States, residing at Philadelphia, in the county of Philadelphia and State of Pennsylvania, have invented a new and useful Improvement in Pyrometers, of which the following is a specification.

My invention relates to thermo-electric pyrometers, and consists in certain improvements in the thermo-electric couple and also in the galvanometer used therewith, which greatly increase the range and convenience of use of such instruments.

My improved thermo-electric couple is designed to indicate the temperature of a distant hot body by means of absorbed radiations of heat which are transmitted to the junction of the couple, the parts of the apparatus being so designed that it will, without focusing or other adjustment indicate correctly the temperature of such body regardless of the distance of the same therefrom, so long as the surface whose temperature is to be measured is large enough to fill the field or angle of view of the tube of the device.

The galvanometer which I have devised for use with my improved couple consists of a coil which is adapted to vibrate between two pole-pieces, said pole pieces being attached respectively to the north and south poles of a pair of magnets, each pole piece connecting like poles of the two magnets. When the pole pieces are true segments of a circle and are so shaped as to provide an air gap of uniform distance between them at all points, equal increments of electro-motive force will produce equal increase in the deflection of the coil. Equal increments of temperature, however, do not produce, in general, equal increments of electro-motive force in the pyrometer. My improvement in the galvanometer relates to means by which the scale of temperatures indicated by the couples is made a scale of equal parts.

In the drawings, forming part of this specification, Figure 1 is a longitudinal section of my improved thermo-electric couple and the devices for gathering and concentrating the heat radiations thereon. Fig. 2 is an enlarged detached sectional view of the couple and the mounting therefor. Fig. 3 is a front view, also on an enlarged scale, of a modification, showing a cluster of couples. Fig. 4 is a view similar to Fig. 1, showing a modification of the devices for gathering and concentrating the heat radiations. Fig. 5 is a view of my improved galvanometer for measuring the current generated by the couple. Fig. 6 is a vertical section on the line VI—VI of Fig. 5. Figs. 7 and 8 are detail views showing modified forms of the pole-pieces of the galvanometer.

Like symbols of reference indicate like parts in each.

In the drawing, 1 is a casing or tube, blackened on its inner surface to absorb heat radiations. 2 is a funnel-shaped tube of reflecting material, preferably circular in cross-section, as shown in Fig. 1, although it may be made square in cross-section, as shown in Fig. 4, or it may be made with only two converging sides. The casing or tube 1 may also be made square in cross-section if preferred. The reflector 2, by a series or succession of reflections, concentrates the radiations of heat gathered by the tube 1 upon the junction of a thermo-electric couple 4, 4', as in Figs. 1 and 2, or the junctions of a cluster of such couples, as in Fig. 3, the negative element of which, in each case, is composed, preferably, of an alloy consisting of about 40 parts nickel and 60 parts copper, and the positive element being composed, preferably of iron. The advantage of using a funnel-shaped reflector 2, instead of a concave mirror or a lens is that such reflector is equally in focus for rays from any distance, thus rendering it unnecessary to adjust or focus the instrument.

To the elements 4, 4', are connected the galvanometer-leads 5, 5'. In the rear of the junction of the couple or couples, is placed a small plane mirror 3, to catch and send back such of the radiations as may pass said junction, thus increasing the power of the instrument while maintaining the constant focus.

6 is an insulating support, having integral projections 6' extending from the face thereof, between which projections the elements 4, 4', are cemented or otherwise fixed, said elements being connected together at their inner ends, the positive end of each couple, in the form shown in Fig. 3, being connected at its outer end to the outer end of the negative element of the adjoining couple. The main body portions of the positive and negative elements in Fig.

3 are insulated from each other by strips of mica or other insulating material $a$.

7 is a handle of wood.

2' is a ring of metal for supporting in position the funnel-shaped reflector 2.

8 is a thin disk of mica, which shields the tube 1 from inrushing currents of air.

9 is a diaphragm, by means of which the size of the opening into the tube may be varied or adjusted, said diaphragm being held in position by means of a shoulder 10' on the cap 10 which is screwed upon the end of the tube 1. By removing the cap 10, the size of the diaphragm may be changed, or a diaphragm of another size substituted, until the reading of the instrument agrees with that of a standard exposed to the same temperature.

In Fig. 4 I show a modification by means of which the instrument may be adapted to two ranges of temperature with one tube. In said figure, the tube 1 is composed of two telescoping sections, 1, 1', the inner section 1', being provided with a groove into which extends a spring $a'$ connected to the outer section 1. When the two sections are in their closed position the instrument is set for the lower range of temperatures, and when in their extended position it is set for the higher range.

The galvanometer which I use in connection with my improved couple is shown in Figs. 5, 6, and 7. It consists of a pair of magnets 11, the poles of which have attached to them the pole-pieces 12, 13, between which pole-pieces is the air gap 14 in which vibrates the coil 15 mounted in suitable bearings 16, and having attached to it the pointer 17. The parts are inclosed in a casing 18, and the instrument is provided with an indicating scale 19. As before stated, when the pole-pieces 12 and 13 are true segments of a circle, as indicated by the dotted lines in Fig. 7 and are so shaped as to leave the air gap 14 of uniform distance between them at all points, as represented by the dotted line in Fig. 8, equal increments of electro-motive force will produce equal increase in the deflection of the coil. But as before stated, equal increments of temperature do not produce, in general, equal increments of electro-motive force. I provide for this variation and make the scale of temperatures indicated by the couple a scale of equal parts in one of two ways, viz:—as shown in Fig. 7, where the pole pieces are changed in shape, as shown in full lines so as to vary the length of that portion of the coil which traverses the field of magnetic force at different parts of the scale;—or, as shown in Fig. 8, where the width of the air gap 14 changes in different parts of the scale, thus varying the intensity of the magnetic field inversely with the varying electro-motive force, and again permitting of a uniform scale. By these means the same printed scale may be used for a variety of couples, and the instrument adjusted to correspond to each of the couples. The forms of pole-pieces shown by the dotted lines in Figs. 7 and 8 are for uniform electro-motive forces; the forms shown by the full lines for use with a couple giving larger electro-motive forces at high than at low temperatures.

The operation of my improvement is as follows:—The end 10 of the tube or casing 1 is pointed at the hot body the temperature of which is to be measured, the only necessary requirement being that the surface whose temperature is to be measured shall be large enough to fill the field of view of the tube. The heat radiation from the hot body entering the end of the tube will be reflected in a series of reflections by the reflector 2, and finally will be converged or concentrated upon the junctions of the couples 4, 4'. By this means a current of electricity is generated, corresponding to the variations in temperature between the hot and cold ends of the couples, said current being transmitted to the galvanometer, where it operates in the ordinary manner. All that is required in the operation of the device is a surface six inches in diameter at a distance of six feet from the observer's hand, 3 inches diameter at 3 feet, and other distances in proportion. So long as the body whose temperature is to be measured exceeds these dimensions the distance makes no variation in the reading of the instrument. No focusing or estimation of distance is required. In two seconds after the tube is pointed at the hot surface its temperature is indicated on the scale of the galvanometer. Thus, a single instrument will serve for taking the temperature of a large number of furnaces, crucibles, or kilns, in an exceedingly brief period of time.

I claim—

1. In a pyrometer, a tube or casing having an inner non-reflecting surface and an opening at its outer end, a thermo-electric couple at the inner end of the tube or casing, a reflector in said casing between said outer end and the said couple and adapted to concentrate the heat radiations entering said tube upon the junction of said couple.

2. In a pyrometer, a tube or casing having an inner non-reflecting surface and having an opening at its outer end, a thermo-electric couple at the inner end of said tube a funnel-shaped reflector having its larger end directed toward said outer end of the tube and its smaller end toward the said couple and adapted to concentrate the heat radiations entering said tube upon the junction of said couple.

3. In a pyrometer, a tube or casing having an inner non-reflecting heat-absorbing surface and an opening at its outer end, a thermo-electric couple at the inner end of the tube or casing, a reflector in said casing between said outer end and the said couple and adapted to concentrate the heat radiations entering said tube and gathered by said heat-absorbing surface upon the junction of said couple, and a second plane reflector in the rear of said couple adapted to catch the heat rays passing said junction and throw them back upon the junction of the couple.

4. In a pyrometer, a tube or casing having an inner non-reflecting surface and an opening at its outer end, a cap connected to said outer end, a diaphragm between the cap and the outer end of the tube, a thermo-electric couple at the inner end of the casing, and a concentrating reflector in said casing between its outer end and the thermo-electric couple and adapted to concentrate the heat radiations gathered by said casing upon the junction of said couple.

5. In a pyrometer, a tube or casing having an inner non-reflecting surface and having an opening at its outer end and a mica shield protecting said opening, a thermo-electric couple at the inner end of the casing, a concentrating reflector in said casing between its outer end and the thermo-electric couple and adapted to concentrate the heat radiations gathered by said casing upon the junction of said couple.

In testimony whereof I have hereunto set my hand.

CHARLES B. THWING.

Witnesses:
CHAS. SANDER,
E. W. ANSTICE.